3,614,862
APPARATUS FOR REMOVING CONTAMINANTS FROM GASES
Harold D. Connors, Milford, Conn., assignor to
Avco Corporation, Stratford, Conn.
Filed June 30, 1969, Ser. No. 837,431
Int. Cl. B01d 45/12
U.S. Cl. 55—321                                    5 Claims

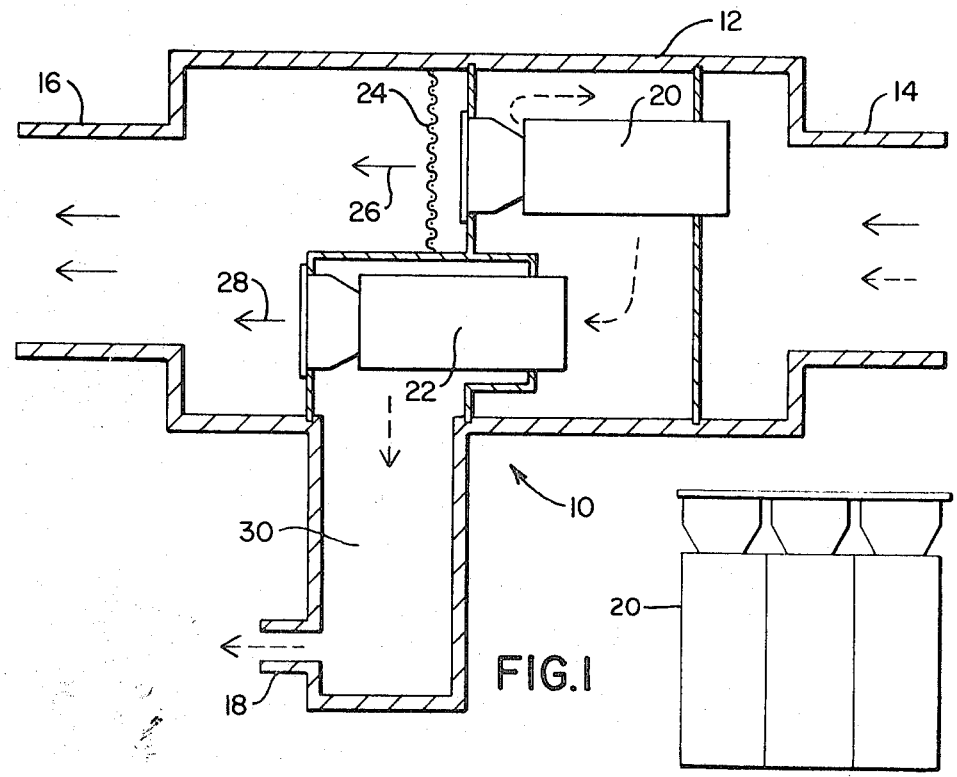
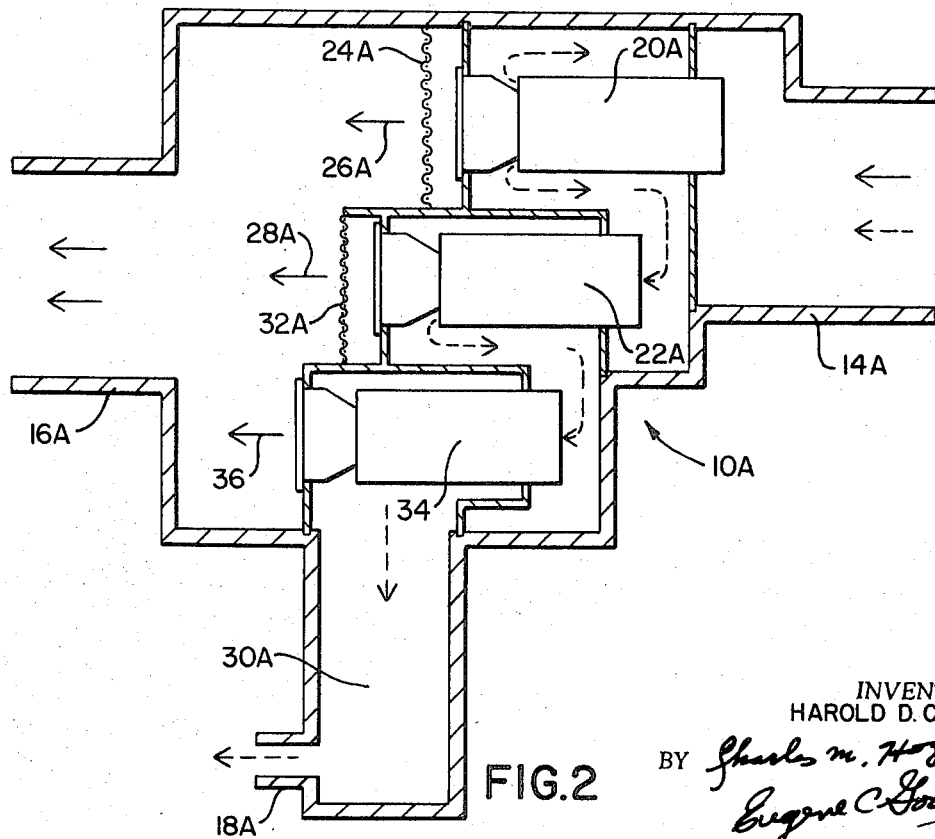

ABSTRACT OF THE DISCLOSURE

This disclosure describes an apparatus for separating and removing contaminant foreign particles from a gas or airstream. A plurality of separating stages are assembled in serial flow arrangement so that only contaminant plus a small percentage of carrier air or gas is transmitted to each succeeding stage.

BACKGROUND OF THE INVENTION

This invention relates to a contaminant separator and more particularly to an improved separator apparatus having serial flow separating elements therein for removing contaminant and foreign matter from an airstream.

The importance of removing small foreign particles from an airstream has long been recognized. Examples of such uses include the removing of ash or unburned carbon from combustion gases from industrial furnaces, for removing powdered lime carried over from the kiln, and other products obtained by processes delivering them in the form of dust carried in streams of air or other gas and, in general, in processes where dust carried into the atmosphere is detrimental or where its recovery would be a possible by-product in the process. Additional uses for separating apparatus of this type are to remove sad and dust from the airstream entering the inlet to gas turbine engines and the like.

Many apparatus for accomplishing this purpose are known in the art. One type of separating apparatus which is used in these devices is the cyclonic or vortex separator tubes. An example of this type tube is shown in U.S. Patent 2,193,883 issued to H. C. Reeves, Mar. 19, 1940. The operation is such that the contaminant-laden air or gas is admitted past inclined guide blades or through a tangential inlet into a chamber, called a cyclone chamber, whereby the air is set spinning therein and by the centrifugal action thus engendered concentrates the particles toward the periphery of the cyclone chamber. The concentrated particles and a small percentage of carrier air are discharged at the periphery of each chamber and the contaminant-free air passes on straight through the cyclone separator.

The separating apparatus known in the art are not entirely satisfactory because of the considerable amount of blowers, ducting, weight and size needed. Quite often the prior art devices have only had a medium efficiency and many had large pressure losses involved in the operation thereof.

Accordingly, it is an object of this invention to provide an arrangement of cyclonic separator tubes to achieve a separating system that can minimize scavenge air requirements that usually necessitates considerable involvement in blowers, ducting, and weight penalties.

A further object of this invention is to provide a separating apparatus with the above-mentioned advantages.

SUMMARY OF THE INVENTION

This invention provides an improved contaminant separator for removing contaminants from a stream of air or gas supplied to the inlet of the separator assembly. The separator utilizes a plurality of separating stages to extract the contaminant from the airstream. The stages are assembled in serial flow arrangement so that only contaminant plus a small pecentage of carrier air or gas is transmitted to each succeeding stage. Each stage comprises a plurality or bank of cyclonic or vortex-type separating tubes. The cleaned air or gas from each stage is substantially contaminant-free and available for direct utilization by any utilization means. Concentrated contaminant or foreign particles are removed from the system.

Other details, uses, and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a diagrammatic representation of a dual-stage cyclonic separating apparatus used in the present invention;

FIG. 2 is a diagrammatic representation of another embodiment of the present invention utilizing three stages of cyclonic separating tubes; and FIG. 3 is a diagrammatic representation of one separating stage illustrating a purality of separating tubes.

DESCRIPTION OF THE ILLUSTRATIVE EMBODIMENT

Reference is now made to FIG. 1 which diagrammatically illustrates on exemplary embodiment of the improved contaminant separator of this invention, which is designated generally by the reference numeral 10. The separator 10 comprises a casing or housing 12 having a contaminated air inlet 14, a common cleaned air outlet 16 and a concentrated contaminant collection chamber 30 which has a discharge outlet 18. The contaminated air passes through a plurality of separating stages or banks, generally designated as 20 and 22, suitably mounted in housing 12 and which are assembled in contaminant serial flow arrangement. Each stage may comprise a plurality of cyclonic or vortex separator tubes as diagrammatically shown in FIG. 3.

In this description, dashed arrows represent contaminant plus carrier air while plain arrows represent cleaned air.

In operation, contaminated air passes through inlet 14 and is admitted past inclined guide blades of the first stage or bank of cyclonic separator tubes 20. In a known manner, the air in the tubes 20 is set spinning and the concentrated particles or contaminant is discharged at the periphery of each tube while the contaminant-free air passes on straight through the cyclonic separator. It has been found that approximately 10% of the air passing through each tube is discharged at the periphery thereof as contaminant carrier air while the balance or approximately 90% of the air exits as cleaned or contaminant-free air.

In order to have the cleaning system operate, it is necessary to back pressure the tubes 20 by restricting the discharge of the tubes. This is accomplished through the use of a fine mesh screen or similar device 24 mounted downstream of the respective separating stage. Thus, cleaned air 26 from tubes 20 is transmitted through screen 24 to a cleaned air outlet passage 16. The contaminant discharge outlets are in flow communication with the inlet of the next stage so that contaminant from the primary tubes 20 plus a small percentage of carrier or transport air, approximately 10% of the air passing through tubes 20, is transmitted to the second separator stage, having a bank of cyclonic separator tubes 22 similar to that of tubes 20 and shown in FIG. 3 for further cleaning and separation. Clean air 28 from the second bank of tubes 22 is also transmitted to the outlet passage 16. Inasmuch as the second bank of tubes 22 is the final separation step, the cleaned air 28 from tubes 22 need not pass through a back pressuring screen but is transmitted directly into the passage 16. Back pressure is not needed at the final stage of the separating system.

The motivating power required to draw the air and contaminant through the separator 10 can be provided by any known apparatus depending on the use of the separator assembly. As an example, when this system is used with a gas turbine engine as described in my copending patent application, entitled "Separator Apparatus for Engine Air Inlets," now issued as United States Pat. 3,534,548; the motivating power is the velocity head at the engine inlet.

Concentrated contaminant for the second bank of cleaning tubes 22 may be either accumulated in a storage or collection chamber 30 or discharged from outlet 18 by any convenient method. Since each separating stage discharges approximately 10% of the air passing therethrough as contaminant carrier air to the next stage, it is seen that only approximately 1% of the inlet airflow is discharged from outlet 18 and not recoverable.

Another exemplary embodiment of this invention is diagrammatically illustrated in FIG. 2 of the drawing. The separator apparatus illustrated in FIG. 2 is very similar to the separator apparatus 10; therefore, the second embodiment separator apparatus will be designated generally by the reference numeral 10A and parts of the separator apparatus 10A which are very similar to corresponding parts of the separator 10 will be designated by the same reference numeral as separator 10 also followed by the letter designation A and not described again. The illustrative embodiment of FIG. 2 shows a contaminant separator 10A in which a three-stage cyclonic separator assembly is suitably mounted in the housing in contaminant serial flow arrangement instead of the two-stage assembly illustrated in FIG. 1. The operation of the three-stage assembly is identical with the operation above described in the two-stage assembly.

Contaminated air passes through inlet 14A and enters the first stage or bank of primary cyclonic separator tubes 20A for contaminant-free discharge from outlet 16A after passing through back pressuring screen 24A. The contaminant plus carrier air from the tubes 20A is transmitted to a second stage or bank of secondary cyclonic separator tubes 22A for a secondary cleaning and contaminant separation. Cleaned air 28A passes from the secondary tubes 22A through a back pressure restricting screen 32A for discharge from outlet 16A. The contaminant from the secondary tubes 22A plus the small amount of carrier air is transmitted to the third stage or tertiary cyclonic separator tubes 34 for final cleaning and separation. Cleaned air 36 passes directly from the tubes 34 to the discharge outlet 16A and concentrated contaminant from the tubes 34 is transmitted for either accumulation in chamber 30A or discharge from outlet 18A. It is noted that in the second illustrative embodiment, approximately 0.1% of the inlet airflow is discharged from outlet 18A and not recoverable.

It should also be noted that the staged cyclonic separator system can have any number of primary stage separator tubes dependent on the inlet air flow rate. However, to obtain the most efficient utilization of the separator tubes, approximately 10% of the number of tubes used in the first separating stage should be used in the second separating stage. Likewise, only 10% of the number of tubes used in the second stage should be used in the tertiary stage separating bank. Thus the greatest number of tubes should be utilized in the first separating stage with decreasing numbers of tubes in each successive operating stage. The separating system of this invention will operate as long as each preceding stage is back pressured and the contaminant plus carrier air is transmitted to the inlet of the next stage. The final separating stage is not back pressured.

It can be seen that this invention presents advantages not heretofore incorporated in separator assemblies. The serial flow arrangement of the cyclonic separator tubes utilizes their high separating efficiency and low pressure loss to achieve a separating system having a high efficiency and low pressure loss and minimizes the amount of air discharged as non-recoverable. The number of stages of this system is only limited by the structural design in which the separating assembly is to be utilized. Reduction in the amount of scavenge air requirements is achieved for a slight decrease in overall performance as each successive stage is added to the system.

While present exemplary embodiments of this invention have been illustrated and described it will be recognized that this invention may be otherwise variously embodied and practiced by those skilled in the art.

What is claimed is:

1. Apparatus for separating contaminant particles from an airstream passing therethrough comprising:

a housing, said housing having a contaminated air inlet, a contaminant-free common air outlet, and a contaminant outlet;

a first cyclonic tube separating stage having a contaminated air inlet, an outlet downstream from the inlet of said stage for contaminant-free air discharge, and a contaminant discharge outlet;

means mounting said first stage in said housing, said first stage inlet being mounted in flow communication with said housing contaminated air inlet for receiving contaminated air therefrom, and said first stage contaminant-free outlet being mounted in flow communication with said common air outlet of said housing for discharging contaminant-free air to said common air outlet;

back pressure means mounted downstream of said first stage contaminant-free air outlet for imparting a back pressure to said separating stage and wherein contaminant-free air discharged from said separating stage passes through said back pressure means to said common contaminant-free air outlet;

a final cyclonic tube separating stage having a contaminated air inlet, an outlet downstream from the inlet of said final stage for discharge of contaminant-free air, and a contaminant discharge outlet;

means mounting said final stage in said housing, said final stage inlet being mounted in flow communication with said first stage contaminant discharge outlet for receiving contaminant discharge from said first stage contaminant outlet, said final stage contaminant-free outlet being mounted in flow communication with said common air outlet for discharging contaminant-free air to said common air outlet, and said final stage contaminant discharge outlet being mounted in flow communication with said housing contaminant outlet for discharging contaminant from said final stage to said housing contaminant outlet; and said housing contaminant-free common air outlet being downstream of each of said separating stages.

2. Apparatus as set forth in claim 1 in which said first and final separating stages each comprise a plurality of cyclonic separating tubes each having an inlet for contaminated air, an axial outlet for contaminant-free air and a contaminant discharge outlet.

3. Apparatus as set forth in claim 2 further comprising at least one additional separating stage of cyclonic separating tubes connected in serial flow communication between said first and final separating stages, each additional separating stage having a plurality of cyclonic separating tubes each of which has a contaminated air inlet, a contaminant-free axial air outlet and a contaminant discharge outlet, each of said contaminant air inlets in one stage being in flow communication with the contaminant discharge outlets of the tubes in the preceding separating stage and the contaminant-free axial outlets being in flow communication with said common contaminant-free air outlet.

4. Apparatus as set forth in claim 3 in which said back pressure means are mounted in said common air outlet downstream of each stage contaminant-free air outlets preceding said final stage for imparting a back pressure to each separating stage preceding said final stage wherein contaminant-free air discharged from each of said tube contaminant-free outlets passes through said back pressure means to said common contaminant-free air outlet.

5. Apparatus as set forth in claim 4 in which said back pressure means comprises a fine mesh screen mounted downstream of each of said stages, the mesh of said screen varying between each stage wherein the back pressure imparted to each separating stage is higher than the succeeding stage.

References Cited

UNITED STATES PATENTS

| | | | |
|---|---|---|---|
| 2,111,754 | 3/1938 | Cheltnam | 55—345 |
| 2,647,588 | 8/1953 | Miller | 55—347 |
| 2,836,256 | 5/1958 | Caskey | 55—349 |
| 3,394,533 | 7/1968 | Sheng Li et al. | 55—337 |
| 3,473,300 | 10/1969 | Wilm et al. | 55—349 |
| 3,483,676 | 12/1969 | Surgisson | 55—337 |

FOREIGN PATENTS

| | | | |
|---|---|---|---|
| 585,750 | 10/1959 | Canada | 55—343 |

FRANK W. LUTTER, Primary Examiner

B. NOZICK, Assistant Examiner

U.S. Cl. X.R.

55—337, 344, 347, 456, 484; 209—144